(Model.)

J. McGRAIL.
PISTON AND VALVE ROD.

No. 311,665. Patented Feb. 3, 1885.

WITNESSES:
C. Neveux
C. Sedgwick

INVENTOR:
J. McGrail
BY Munn & Co
ATTORNEYS.

UNITED STATES PATENT OFFICE.

JOSEPH McGRAIL, OF SAVANNA, ILLINOIS.

PISTON AND VALVE ROD.

SPECIFICATION forming part of Letters Patent No. 311,665, dated February 3, 1885.

Application filed June 4, 1884. (Model.)

*To all whom it may concern:*

Be it known that I, JOSEPH MCGRAIL, of Savanna, in the county of Carroll and State of Illinois, have invented a new and useful Improvement in Piston and Valve Rods, of which the following is a full, clear, and exact description.

The special object of my invention is to save the time and labor required for repair or replacement of worn valve-stems and piston-rods, particularly the valve-stems of locomotive-engines. The usual method is to cut off the worn stem from the yoke and weld a new one on, which involves considerable expense for material and labor, besides the loss of old material and the necessity of keeping the engine idle for a day or two.

My invention consists in the use of a sleeve on the rod and stem which can be quickly fitted to an old rod or replaced when worn, as hereinafter described and claimed.

Reference is to be had to the accompanying drawings, forming a part of this specification, in which similar letters of reference indicate corresponding parts in both the figures.

Figure 1:
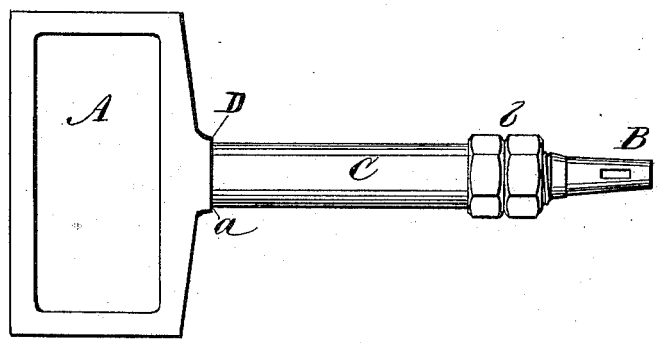
Figure 2:
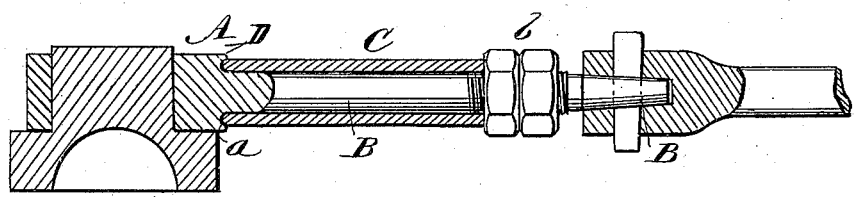

Figure 1 is a plan view of a valve yoke and stem of my improved construction, and Fig. 2 is a longitudinal section of the same.

The yoke A and stem B are forged in one piece, as usual. Upon the stem is a sleeve, C, seated so as to form a steam-tight joint in an annular recess, $a$, formed in the shoulder D between the stem and yoke, and held up to place by nuts $b$, which are threaded on the outer end of the stem; or equivalent means may be used in place of the nuts. The sleeve C forms the wearing-surface of the stem, and will be preferably made of hard steel, so that this construction combines the strength of the wrought-iron stem with the hardened steel surface for wear, and consequently they will wear much longer.

In repairing a worn stem it is first turned down to gage the seat $a$, then cut and the sleeve put on. Thereby in a short space of time the rod is made better than new, and without putting the engine off regular work. The sleeve can be readily renewed when required, the seat in that case not needing to be recut.

As a method simply of repairing worn valve-stems of locomotives this invention is of great advantage, and it is evident that it can be applied to valve-stems and piston rods generally, both in repairs and in the construction of new rods.

The sleeve can be made steam-tight at the yoke without a recess, as shown.

I am aware that a valve-rod composed of a screw-threaded tube into which a rod, after passing through the valve, is screwed is old, and I therefore do not claim such invention.

Having thus described my invention, I claim as new and desire to secure by Letters Patent—

The combination, with the yoke A, provided with the shoulder D, having the recess $a$, and the stem B, having its outer end screw-threaded, of the plain sleeve C, having its end resting in the said recess, and the clamping-nuts $b$ on the screw-threaded end of the stem, substantially as herein shown and described, and for the purpose set forth.

JOSEPH McGRAIL.

Witnesses:
   W. I. BOWEN,
   S. GREENLEAF,
   GEORGE LAMB.